United States Patent
Yoon et al.

(10) Patent No.: US 9,931,958 B2
(45) Date of Patent: Apr. 3, 2018

(54) AUXILIARY BATTERY RECHARGING CONTROL METHOD AND APPARATUS

(71) Applicants: Hyundai Motor Company, Seoul (KR); Kia Motors Corporation, Seoul (KR)

(72) Inventors: Dong Pil Yoon, Incheon (KR); Dong Ho Yang, Incheon (KR); Seung Ho Lee, Gyeonggi-do (KR); Jun Yeon Park, Gyeonggi-do (KR); Seung Jae Yoo, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 235 days.

(21) Appl. No.: 15/088,690

(22) Filed: Apr. 1, 2016

(65) Prior Publication Data
US 2017/0166076 A1    Jun. 15, 2017

(30) Foreign Application Priority Data
Dec. 14, 2015   (KR) .................. 10-2015-0178461

(51) Int. Cl.
*H02J 7/00* (2006.01)
*B60L 11/18* (2006.01)
(52) U.S. Cl.
CPC ....... *B60L 11/1861* (2013.01); *B60L 11/1844* (2013.01); *B60L 11/1868* (2013.01)
(58) Field of Classification Search
CPC .................................. B60L 11/1861

USPC ........................................................ 320/109
See application file for complete search history.

(56) References Cited

U.S. PATENT DOCUMENTS

| | | | |
|---|---|---|---|
| 6,404,163 B1 * | 6/2002 | Kapsokavathis | H02J 7/0029 320/104 |
| 8,378,638 B2 * | 2/2013 | Majima | G01R 31/3675 320/132 |
| 8,461,846 B2 * | 6/2013 | Makarewicz | G01R 31/3627 324/433 |

(Continued)

FOREIGN PATENT DOCUMENTS

| | | |
|---|---|---|
| JP | 2012-010503 A | 1/2012 |
| JP | 2014-090630 A | 5/2014 |

(Continued)

*Primary Examiner* — Suresh Memula
(74) *Attorney, Agent, or Firm* — Mintz Levin Cohn Ferris Glovsky and Popeo, P.C.; Peter F. Corless

(57) ABSTRACT

An auxiliary battery recharging control method and apparatus are provided. The method includes determining whether a recharging prohibition condition is established, based on first state information of a vehicle and second state information of a first battery, at regular recharging intervals, when a periodic recharging mode is executed, based on a first ignition (IG) voltage. Recharging is executed based on whether a critical recharging condition is established using third state information of a second battery, when an automatic recharging mode is executed, based on a second IG voltage. Additionally, a voltage variation is calculated of the second battery selected from the third state information, and at least one of a recharging time and a recharging voltage is adjusted, based on the calculated voltage variation, or the recharging interval is adjusted, based on the calculated voltage variation.

19 Claims, 6 Drawing Sheets

(56) References Cited

U.S. PATENT DOCUMENTS

| | | | | |
|---|---|---|---|---|
| 8,493,033 B2* | 7/2013 | Banta | .................. | H02J 9/061 |
| | | | | 320/137 |
| 9,081,039 B2* | 7/2015 | Julson | .............. | G01R 19/16571 |
| 9,507,368 B2* | 11/2016 | Ito | .............................. | G05F 5/00 |
| 9,630,514 B2* | 4/2017 | Ferrel | .................... | H02J 7/1423 |
| 9,652,905 B2* | 5/2017 | Peev | .................... | G07C 5/0808 |
| 9,793,722 B2* | 10/2017 | Tamura | ................. | B60R 16/033 |

FOREIGN PATENT DOCUMENTS

| | | |
|---|---|---|
| JP | 2014-107968 A | 6/2014 |
| JP | 2014-150664 A | 8/2014 |
| KR | 10-2012-0101820 A | 9/2012 |
| KR | 10-2015-0070903 A | 6/2015 |
| KR | 10-2015-0130671 A | 11/2015 |

\* cited by examiner

AUXILIARY BATTERY RECHARGING CONTROL METHOD AND APPARATUS

CROSS-REFERENCE TO RELATED APPLICATION(S)

This application claims the benefit of Korean Patent Application No. 10-2015-0178461, filed on Dec. 14, 2015, which is hereby incorporated by reference as if fully set forth herein.

BACKGROUND

Field of the Invention

The present invention relates to a battery for an electric vehicle, and more particularly to a method and apparatus for controlling recharging of an auxiliary battery for an electric vehicle.

Discussion of the Related Art

Electric vehicles (EVs) and plug-in hybrid electric vehicles (PHEVs), which are equipped with a recharging system, are provided with two batteries, namely, a main battery configured to supply drive power to an electric motor to drive wheels, and an auxiliary battery configured to supply electric power to general electric elements.

In other words, such an EV requires an operating voltage to start or initiate electric elements, and a drive voltage to drive a motor for movement of the EV. The operating voltage and drive voltage are supplied to the batteries. Generally, for supply of the drive voltage, a high-voltage battery (or a main battery), which has relatively high energy density and relatively high output density, is used. However, electric elements of the EV operate at several volts and, thus, are configured to receive a desired voltage from a separate electric-element battery (or an auxiliary battery), which is adapted to supply a voltage suitable for the electric elements.

However, the auxiliary battery may be discharged after engine turn-off, in spite of the presence of the main battery for driving of the vehicle. Furthermore, once the auxiliary battery is discharged to a final discharge voltage, the auxiliary battery may no longer be used and, thus, re-operation of the vehicle may be impossible.

Accordingly, to solve the problems caused by discharge of the auxiliary battery, various methods have been developed in the related art. For example, a method has been developed in which voltage supply from an auxiliary battery is automatically cut off when a predetermined condition is satisfied (e.g., when door locking is performed after engine turn-off under the condition that headlights are in an ON state), voltage supply from an auxiliary battery is automatically cut off, or the headlights are automatically turned off, and a method in which, when a predetermined time elapses after turn-on of vehicle accessories (ACCs), voltage supply from an auxiliary battery is automatically cut off. In such methods of the related art, however, there is a limitation in solving discharge of the auxiliary battery caused by dark current. Therefore, it is necessary to provide a recharging control technology capable of maintaining the auxiliary battery at least in a rechargeable state.

SUMMARY

Accordingly, the present invention provides an auxiliary battery recharging control method and apparatus that substantially obviate one or more problems due to limitations and disadvantages of the related art. An object of the present invention is to provide an auxiliary battery recharging control method and apparatus capable of controlling recharging of an auxiliary battery in an automatic or periodic manner based on ON/OFF states of an ignition (IG) voltage, taking into consideration voltage drop caused by load of electric elements and dark current.

Additional advantages, objects, and features of the exemplary embodiments will be set forth in part in the description which follows and in part will become apparent to those having ordinary skill in the art upon examination of the following or may be learned from practice of the exemplary embodiments. The objectives and other advantages of the embodiments may be realized and attained by the structure particularly pointed out in the written description and claims hereof as well as the appended drawings.

According to one aspect, a battery recharging control method may include determining, by a recharging determiner, whether a recharging prohibition condition has been established, based on first state information of a vehicle and second state information of a first battery, at a recharging interval of a predetermined time, when the recharging determiner executes a periodic recharging mode, based on a first ignition (IG) voltage applied thereto, executing recharging, by the recharging determiner, based on determining, by a first controller, whether a critical recharging condition has been established, based on third state information of a second battery, when the recharging determiner executes an automatic recharging mode, based on a second IG voltage applied thereto; and calculating a voltage variation of the second battery selected from the third state information by the first controller, and varying at least one of a recharging time and a recharging voltage by the first controller, based on the calculated voltage variation, or varying the recharging interval by the recharging determiner, based on the calculated voltage variation.

The battery recharging control may further include determining, by the recharging determiner, whether the automatic recharging mode or the periodic recharging mode is required based on the applied IG voltage. Additionally, the battery recharging control method may include activating a relay by a second controller and executing recharging of the second battery by the first controller when the third state information corresponds to the critical recharging condition and completing the recharging of the second battery by the first controller when the third state information exceeds the critical recharging condition. The battery recharging control method may further include transmitting, by the recharging determiner, information regarding the determined recharging mode to the first controller when the at least one of the first state information and the second state information does not correspond to the recharging prohibition condition.

The activation of the relay by the second controller and execution of the recharging of the second battery by the first controller when the third state information corresponds to the critical recharging condition may include receiving, by the first controller, the third state information of the second battery from a second battery sensor, and determining, by the first controller, whether the third state information corresponds to the critical recharging condition. Additionally, the activation of the relay by the second controller and execution of the recharging of the second battery by the first controller when the third state information corresponds to the critical recharging condition may include requesting, by the second controller, the recharging determiner to allow recharging when the third state information corresponds to the critical recharging condition, and requesting, by the recharging determiner, the second controller to activate the relay based on the request for the recharging allowance.

The completion of the recharging of the second battery by the first controller when the third state information exceeds the critical recharging condition may include requesting, by the second controller, the recharging determiner to complete recharging, and requesting, by the recharging determiner, the second controller to deactivate the relay based on the request for the recharging completion. The completing the recharging of the second battery by the first controller when the third state information exceeds the critical recharging condition may include initializing the recharging interval by the recharging determiner.

In another aspect of the present invention, a battery recharging control apparatus may include a recharging determiner configured to whether a recharging prohibition condition has been established, based on first state information regarding a vehicle and second state information of a first battery, at a recharging interval of a predetermined time, when the recharging determiner executes a periodic recharging mode, based on a first ignition (IG) voltage applied thereto, and executing recharging based on whether a critical recharging condition has been established, based on third state information of a second battery, when the recharging determiner executes an automatic recharging mode, based on a second IG voltage applied thereto, and a first controller configured to calculate a voltage variation of the second battery selected from the third state information, and varying at least one of a recharging time and a recharging voltage, based on the calculated voltage variation, wherein the recharging determiner varies the recharging interval, based on the calculated voltage variation.

The recharging determiner may be configured to determine whether the automatic recharging mode or the periodic recharging mode has to be executed, based on the applied IG voltage. The battery recharging control apparatus may further include a second controller configured to activate a relay, wherein the first controller may be configured to execute recharging of the second battery when the third state information corresponds to the critical recharging condition.

The first controller may then be configured to complete the recharging of the second battery when the third state information exceeds the critical recharging condition. The recharging determiner may be configured to transmit information based on the determined recharging mode to the first controller when the at least one of the first state information and the second state information does not correspond to the recharging prohibition condition.

The battery recharging control apparatus may further include a battery sensor configured to transmit the third state information of the second battery to the first controller. In particular, the first controller may be configured to determine whether the third state information corresponds to the critical recharging condition. The second controller may be configured to request the recharging determiner to allow recharging when the third state information corresponds to the critical recharging condition. The recharging determiner may be configured to request the second controller to activate the relay based on the request for the recharging allowance. The second controller may further be configured to request the recharging determiner to complete recharging. The recharging determiner may be configured to request the second controller to deactivate the relay based on the request for the recharging completion. The recharging determiner may be configured to initialize the recharging interval.

In another aspect of the present invention, a non-transitory computer-readable recording medium recorded may be provided with a program to execute the above-described method. The auxiliary battery recharging control method and apparatus according to the present invention provide the following effects.

First, in accordance with the present invention, an expected lifespan of the auxiliary battery may be increased by preventing performance degradation of the auxiliary battery by determining whether recharging of the auxiliary battery is required, based on state of the vehicle, state of the main battery, and state of the auxiliary battery.

Second, in accordance with the present invention, a problem of engine start impossibility may be solved by preventing discharge of the auxiliary battery even when the electric vehicle is left in an engine-OFF state for a long time, through recharging of the auxiliary battery.

Third, in accordance with the present invention, a reduction in costs and a reduction in maintenance and repair expense may be achieved, through an enhancement in durability of the auxiliary battery.

Fourth, in accordance with the present invention, a voltage may be supplied from the auxiliary battery for a lengthened period of time even in an engine-OFF state It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and along with the description serve to explain the principle of the invention. In the drawings.

DETAILED DESCRIPTION

Figure 1:
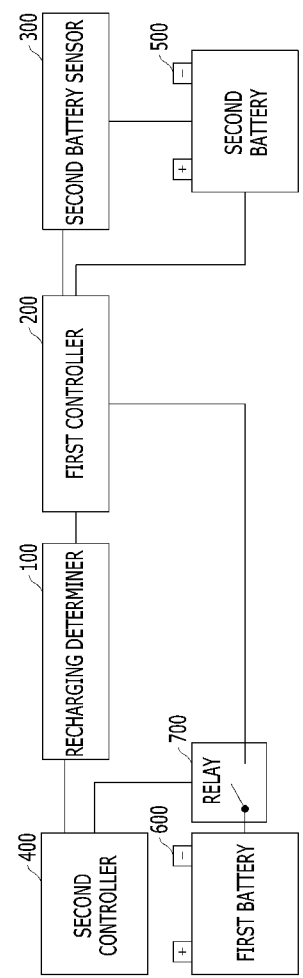
FIG. 1 is a block diagram illustrating an auxiliary battery recharging control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings, and the same or similar elements are designated by the same reference numerals regardless of the numerals in the drawings and redundant description thereof will be omitted. The suffixes "module" and "unit" of elements herein are used for convenience of description and thus can be used interchangeably and do not have any distinguishable meanings or functions.

In the following description of the present invention, a detailed description of known functions and configurations incorporated herein will be omitted when it may obscure the subject matter of the present invention.

Particularly, charging of a battery may be divided into initial charging and auxiliary charging. The initial charging may be executed to activate pole plates of the battery under the condition that an electrolyte solution is placed into the battery when the battery is initially used after manufacture thereof. The auxiliary charging may be executed to supplement electrical energy consumed due to self-discharge of the battery or during use of the battery. In the present invention, auxiliary charging indicates auxiliary charging (e.g., recharging) to maintain the charged state of an auxiliary battery at a predetermined level or greater. Hereinafter, auxiliary charging and recharging are used to have the same meaning.

In the present invention, the auxiliary battery may be operated to be automatically recharged in an ignition (IG) 1 ON state, taking into consideration the state of the auxiliary battery (hereinafter, referred to as an "automatic recharging mode") and to be periodically recharged in an IG 1 OFF state (hereinafter, referred to as a "periodic recharging mode"). In addition, the present invention takes into consideration a vehicle state, a main battery state, and an auxiliary battery state. In particular, the present invention executes control operations to vary recharging time, recharging voltage, and recharging interval, based on variation in auxiliary battery state.

In an exemplary embodiment of the present invention, an auxiliary battery recharging control apparatus may include a recharging determiner configured to determine a vehicle state and a recharging prohibition condition, a first controller configured to necessity of recharging based on a state of the auxiliary battery, and a second controller configured to operate a relay of the main battery and an output of the main battery.

Figure 2:
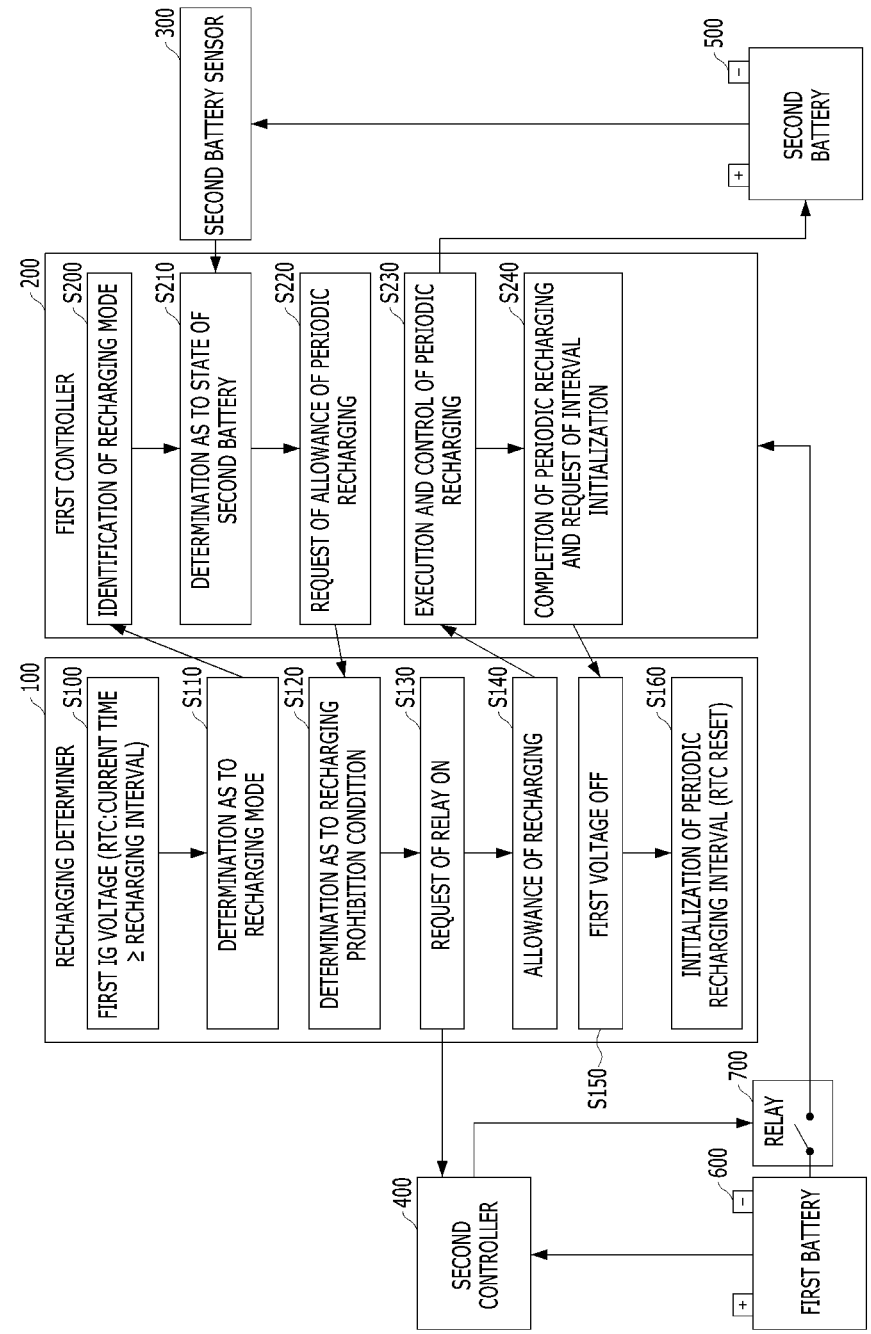
FIG. 2 is a flowchart illustrating a periodic recharging mode in an auxiliary battery recharging control method according to an exemplary embodiment of the present invention.
Figure 3:
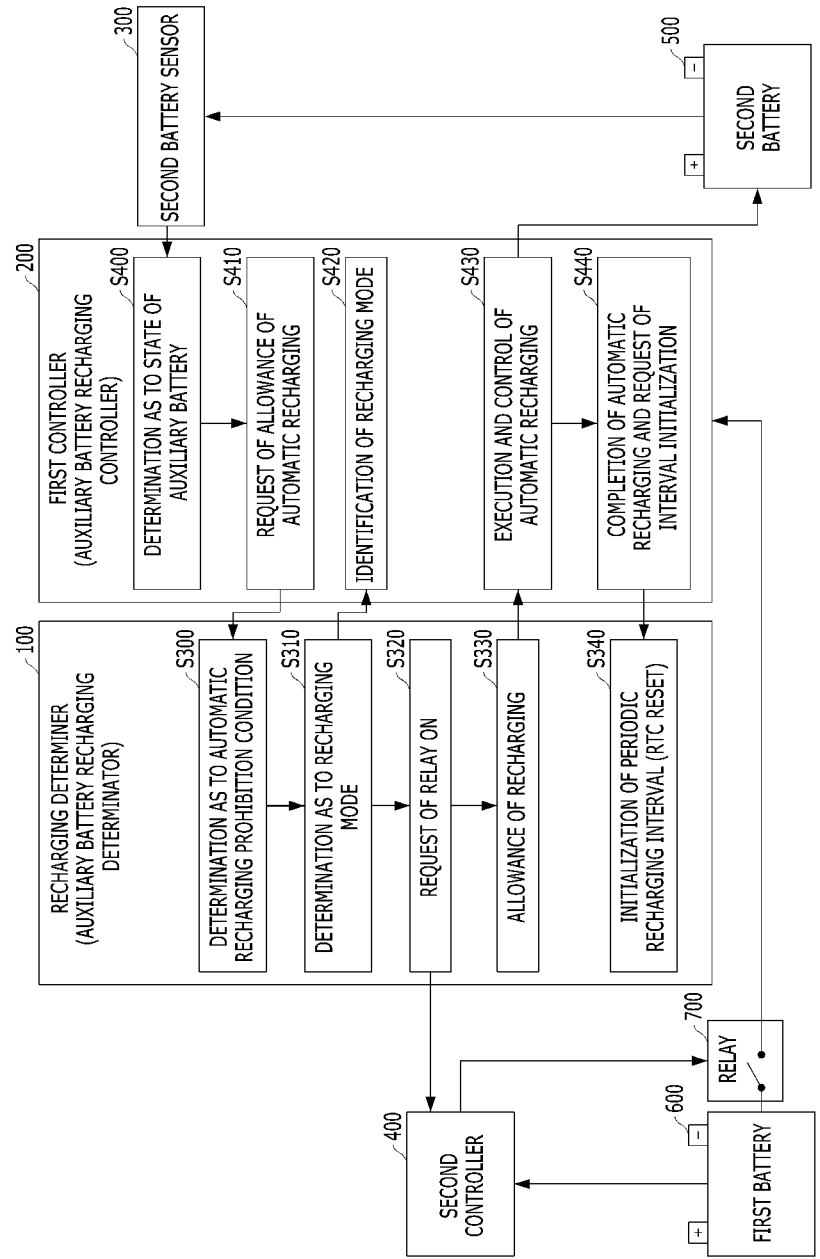
FIG. 3 is a flowchart illustrating an automatic recharging mode in the auxiliary battery recharging control method according to the illustrated exemplary embodiment of the present invention.

Hereinafter, a configuration of the auxiliary battery recharging control apparatus according to the present invention will be described with reference to FIG. 1. With reference to FIGS. 2 and 3, a periodic recharging mode and an automatic recharging mode in an auxiliary battery recharging control method according to the present invention will be described, respectively. In addition, effects obtained in accordance with application of the auxiliary battery recharging control method and apparatus will be described with reference to FIGS. 4 to 6.

FIG. 1 is a block diagram explaining the auxiliary battery recharging control apparatus according to the illustrated exemplary embodiment of the present invention. Referring to FIG. 1, the auxiliary battery recharging control apparatus according to the illustrated exemplary embodiment of the present invention may include a recharging determiner 100, a first controller 200, a first battery sensor 300, a second controller 400, a second battery 500 (hereinafter, referred to as an "auxiliary battery"), a first battery 600 (hereinafter, referred to as a "main battery"), and a relay 700.

The constituent elements illustrated in FIG. 1 are not essential to the auxiliary battery recharging control apparatus and, as such, the auxiliary battery recharging control apparatus may be implemented using an increased or reduced number of constituent elements, compared to the above-described constituent elements. Hereinafter, the above-described constituent elements will be described in detail.

The recharging determiner 100 may be configured to determine whether a current recharging mode is a periodic recharging mode or an automatic recharging mode, based on an ignition (IG) voltage applied to the recharging determiner 100. When an IG 1 voltage applied to the recharging determiner 100 is switched to an OFF state, the periodic recharging mode may be executed. Further, when the IG 1 voltage applied to the recharging determiner 100 is in an ON state, the automatic recharging mode may be executed. When the IG 1 voltage is switched to an OFF state, the recharging determiner 100 may be configured to calculate a recharging interval of the periodic recharging mode. When the current time corresponds to the calculated recharging interval, the recharging determiner 100 may be configured to begin the periodic recharging mode.

In an exemplary embodiment, when the IG 1 voltage applied to the recharging determiner 100 may be switched to an OFF state, the recharging determiner 100 may be configured to count the current time using a real time clock (RTC), to determine whether the current time corresponds to the calculated recharging interval. When the current time corresponds to the calculated recharging interval, the recharging determiner 100 may be configured to activate a relay to switch on a separate control voltage to execute the periodic recharging mode. The recharging determiner 100 may further be configured to monitor a state of the vehicle and state of the main battery 600, and determine whether a recharging prohibition condition has been established, based on the monitored results.

In addition, the recharging determiner 100 may be configured to monitor whether the current gear stage of the vehicle corresponds to a parking (P) stage, whether a charger is connected to the vehicle, whether doors, a hood, a tail gate, etc. of the vehicle are closed, and other conditions, to determine whether recharging is allowable. The recharging determiner 100 may further be configured to monitor temperature, voltage, and current of the main battery 600, state of the main battery 600, for example, state of charge (SOC) of the main battery 600, etc, to determine whether the charged amount of the main battery 600 is insufficient, to thus determine whether a recharging prohibition condition has been established. In response to determining that the recharging prohibition condition has been established, the recharging determiner 100 may be configured to block or prohibit recharging of the auxiliary battery 500.

Further, in response to determining that no recharging prohibition condition has been established, the recharging determiner 100 may be configured to request the second controller 400 to switch on the relay 700, and permit the first controller 200 to execute recharging. In response to determining that a recharging prohibition condition has been established, the recharging determiner 100 may be configured to terminate recharging after the determination, and switch off the relay 700 adapted to switch on the separate control voltage for execution of the periodic recharging mode, under the control of the second switch 400.

After completion of recharging, the recharging determiner 100 may be configured to reset the recharging interval stored in the RCT, or adjust the recharging interval based on a variation in second battery state. For example, when voltage drop of the second battery 500 increases due to aging of the second battery 500 or an increase in dark current, the recharging determiner 100 may be configured to vary the recharging interval to reduce the recharging interval and prevent discharge.

In an exemplary embodiment, the recharging determiner 100 may be a hybrid control unit (HCU) or a vehicle control unit (VCU). The HCU (VCU), which is a main processing unit of an electric vehicle, may be configured to operate a battery management system (BMS) to execute management of a main battery (or a high-voltage battery), to estimate the charged state of the main battery, current and voltage monitoring for the main battery, etc., thereby maintaining the main battery under optimal conditions, a low direct current-direct current (DC-DC) converter (LDC) configured to manage an auxiliary battery based on conditions of the main battery while estimating the consumed amount of an electric element voltage (e.g., 12V), to thus adjust the electric element voltage, an engine control unit (ECU) configured to start an engine for self-generation, and adjust an air suction amount through electronic throttle control (ETC), to thus adjust an output power from the engine, a torque control unit (TCU) configured to adjust a transmission ratio while determining a regenerative braking amount through transfer of output information as to a power source, and a motor control unit (MCU) configured to execute control operations for transfer of a motor torque command, electricity generation, and maintenance of the batteries in an optimally charged state. Through the above-described control operations, the HCU (VCU) may be configured to distribute a drive power of the vehicle and execute vehicle operation modes.

The first controller 200 may be configured to monitor a state of the auxiliary battery 500, to determine whether the charged state of the auxiliary battery 500 is equal to or less than a predetermined level. In response to determining that the charged state of the auxiliary battery 500 is equal to or less than a predetermined level, the first controller 200 may be configured to request the recharging determiner 100 to allow recharging. In particular, the first controller 200 may be configured to vary one of a recharging voltage and a recharging time, based on a state variation degree of the auxiliary battery 500.

In an exemplary embodiment, the first controller 200 may be configured to determine whether execution of recharging is required, by comparing a state of the auxiliary battery 500 with critical recharging conditions. The critical recharging conditions may be conditions regarding whether the voltage of the auxiliary battery 500 is less than a predetermined threshold voltage (e.g., a periodic-recharging allowable voltage) and whether SOC of the auxiliary battery 500 is less than a predetermined critical SOC. When state of the auxiliary battery 500 satisfies a predetermined level, the first controller 200 may be configured to complete recharging, and request that the recharging determiner 100 initialize the recharging interval.

The first controller 200 may be a low voltage DC-DC converter (LDC) (hereinafter, referred to as an "LDC"). The LDC is a DC-DC converter configured to convert a DC voltage input into an output having a DC voltage different from the DC voltage input. In addition, the LDC may be configured to monitor a charged state of the auxiliary battery 500 and adjust recharging of the auxiliary battery 500, based on the monitored results.

The second battery sensor 300 is a sensor configured to monitor the state of the auxiliary battery 500. The second battery sensor 300 may be configured to transmit auxiliary battery state information generated based on the monitored results to the first controller 200. In addition, the second battery sensor 300 may be an intelligent battery sensor (IBS). The IBS may be configured to sense voltage, current, temperature, SOC, and state of health (SOH) of the associated battery, and may be configured to transmit the sensed information to the LDC.

In response to receiving a relay ON request from the recharging determiner 100, the second controller 400 may be configured to switch on the relay 700, and then transmit information representing the ON state of the relay 700 to the recharging determiner 100. In the ON state of the relay 700, the first controller 200 may be configured to output, from the main battery 600, electric power required for recharging of the auxiliary battery 500. In particular, the second controller 400 may be configured to continuously transmit a state of the main battery 600, for example, SOC, to the recharging determiner 100.

In an exemplary embodiment, the second controller 400 may be a battery management system (BMS). The BMS is a system configured to manage the associated battery to eliminate possibility of explosion caused by overcharging, overheating, or external impact. Generally, large-capacity batteries are separately equipped with a BMS. For electric vehicles, a BMS is also provided. The BMS may be configured to monitor a state of the associated battery represented by diverse information. Information representing battery state may include voltage, temperature, SOC, state of health (SOH), air flow, current input/output state, etc. of the associated battery. In addition, the BMS may be configured to execute calculation required for supplying electric power from the battery, based on the above-described information, and may be configured to communicate with an external device to receive and transmit various information under the condition that the BMS is connected to the external device.

The second battery 500 and the first battery 500 may be the auxiliary battery and the main battery, respectively. In the following description, no detailed description of the second battery 500 and first battery 600 will be given since the second battery 500 and first battery 600 have been described in detail hereinbefore. The relay 700 may be configured to connect or disconnect the first controller 200 and the first battery 600 based on whether recharging is required. In an exemplary embodiment, the relay 700 may be switched on or off under operation of the second controller 400, to allow or prevent recharging.

FIG. 2 is a flowchart explaining a periodic recharging mode in an auxiliary battery recharging control method according to an exemplary embodiment of the present invention. In the periodic recharging mode, a charged state of the auxiliary battery may be monitored at intervals of a predetermined time in an OFF state of an IG 1 voltage. When the charged state of the auxiliary battery is equal to or less than a predetermined level, a control operation may be executed to maintain the charged state of the auxiliary battery at the predetermined level, using the main battery.

In the periodic recharging mode, recharging time, recharging voltage, and recharging interval may be adjusted based on variation in auxiliary battery state. As a result, discharge caused by aging of the second battery or an increase in dark current may be rectified. For example, when the vehicle is left in an engine-OFF state for a substantial period of time, recharging of the auxiliary battery may be periodically executed in the periodic recharging mode under the condition that recharging time, recharging voltage, and recharging interval are varied.

Referring to FIG. 2, when the IG 1 voltage is switched to an OFF state, the recharging determiner 100 may be configured to compare a counted value from the RTC that corresponds to the current time with a recharging interval, to determine whether the current time corresponds to the recharging interval (S100). When the current time corresponds to the recharging interval, a first IG voltage (IG 3 voltage) may be switched on. The first controller 200 may be activated by the first IG voltage, and the recharging determiner 100 may be configured to determine a recharging mode (S110). In other words, the recharging determiner 100 may be configured to distinguish a periodic recharging mode and an automatic recharging mode based on the voltage applied thereto.

In an exemplar embodiment, the recharging determiner 100 may be configured to distinguish the periodic recharging mode, which corresponds to the first IG voltage, and transmit information representing discernment of the periodic recharging mode to the first controller 200 which, in turn, may be configured to identify the periodic recharging mode (S200). The first controller 200 may further be configured to determine state of the second battery 500, to determine whether the determined state of the second battery 500 corresponds to a critical recharging condition.

In addition, the first controller 200 may be configured to determine whether the determined state of the second battery 500 corresponds to the critical recharging condition, based on whether the voltage of the second battery 500 is less than a predetermined voltage (e.g., recharging allowable voltage) or whether SOC of the second battery is less than a recharging allowable SOC. When the determined state of the second battery 500 corresponds to the critical recharging condition, the first controller 200 may be configured to request that the recharging determiner 100 perform periodic recharging (S220).

In response to receiving a recharging request from the first controller 200, the recharging determiner 100 may be configured to determine whether the state of the vehicle and the state of the first battery 600 correspond to a recharging prohibition condition (S120). The recharging prohibition condition may be when it is determined that doors, a hood, a tail gate, etc. of the vehicle are closed, based on signals from a door opening switch or sensor, a hood opening switch, a tail gate opening switch, etc, when the voltage of the first battery 600 is less than a predetermined voltage, when SOC of the first battery 600 is less than a predetermined SOC, when recharging is continuously executed a predetermined number of times or more, or when the voltage of the second battery 500 remains less than the predetermined voltage or SOC of the first battery 600 remains less than the predetermined SOC, after monitoring for a predetermined period of time after recharging.

When the recharging determiner 100 determines that the state of the vehicle and state of the first battery 600 do not correspond to the recharging prohibition condition, the recharging determiner 100 may be configured to request the second controller 400 to perform switching-on of the relay 700 (S130). Simultaneously with the request of switching-on of the relay 700 to the second controller 400, the recharging determiner 100 may be configured to transmit a signal that represents allowance of recharging based on switching-on of the relay 700 (S140). The first controller 200 may then be configured to execute recharging of the second battery 500, and, simultaneously, execute a control operation associated with recharging time and recharging voltage (S230).

Figure 5:
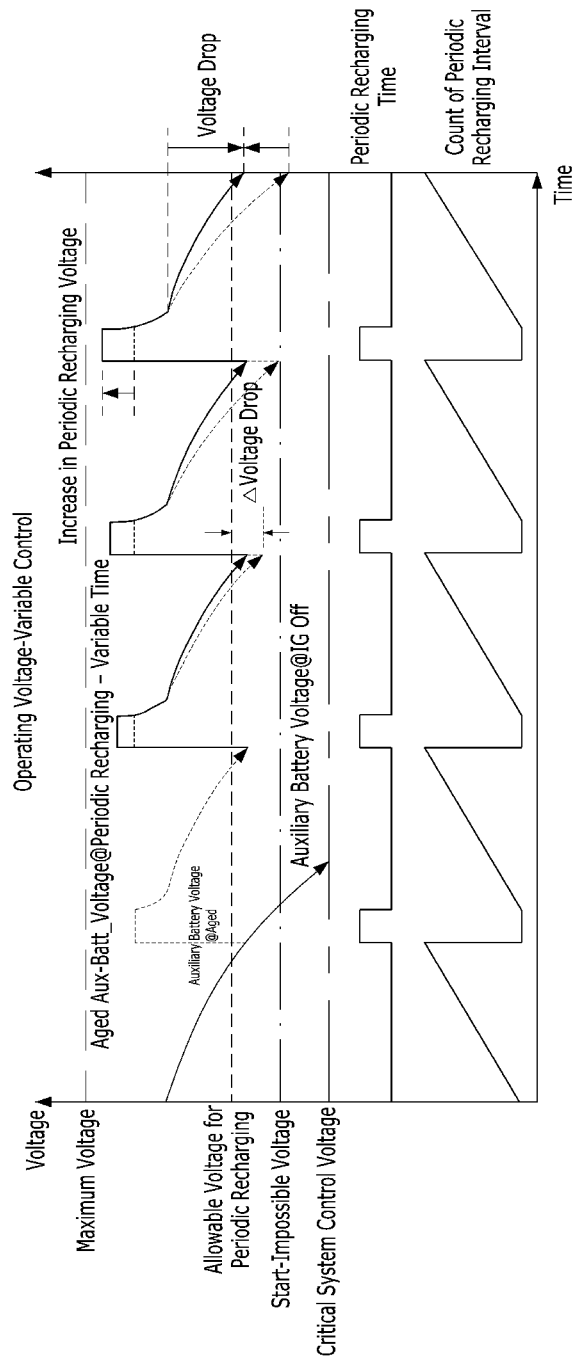
FIG. 5 is a diagram illustrating effects obtained through recharging voltage control according to an exemplary embodiment of the present invention.
Figure 6:
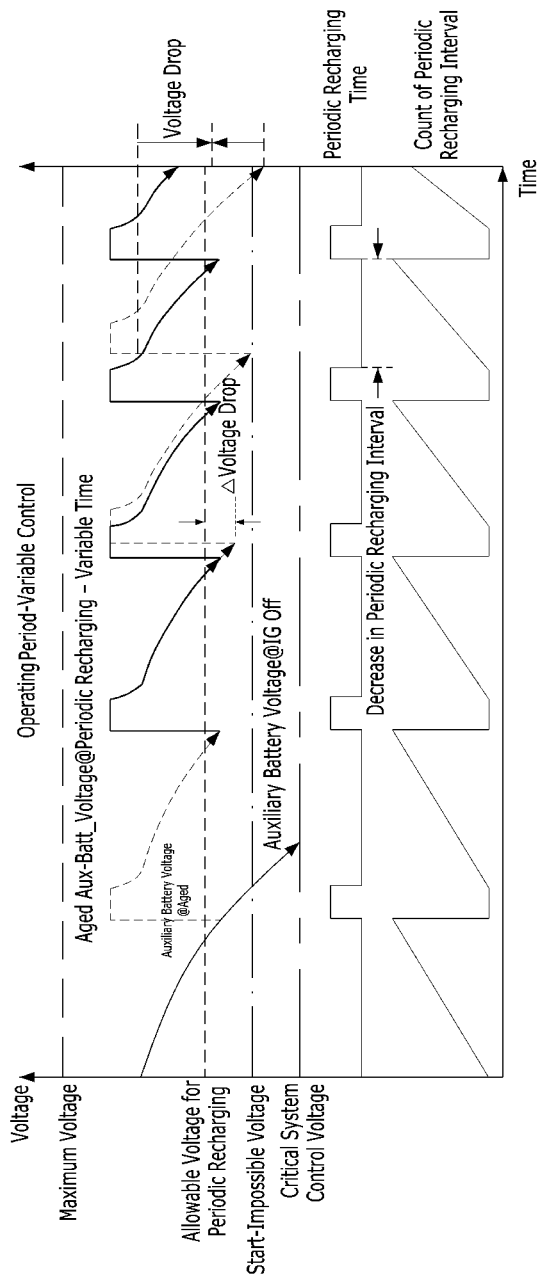
FIG. 6 is a diagram illustrating effects obtained through recharging interval control according to an exemplary embodiment of the present invention.

The control operation of the first controller 200 associated with recharging time and recharging voltage will be described in detail with reference to FIGS. 4 to 6. When the first controller 200 determines, after monitoring state of the second battery 500, that voltage of the second battery 500 is greater than the recharging allowable voltage, SOC of the second battery 500 is greater than the predetermined SOC, or recharging time is greater than a predetermined time, the first controller 200 may be configured to complete recharging, and request that the recharging determiner 100 initialize the recharging interval (S240). Thereafter, the recharging determiner 100 may be configured to initialize the RTC, to initialize the recharging interval, and operate the second controller 400 to switch off the relay 700 (S160).

FIG. 3 is a flowchart illustrating an automatic recharging mode in the auxiliary battery recharging control method according to the illustrated exemplary embodiment of the present invention.

In the automatic recharging mode, a charged state of the auxiliary battery may be monitored in an ON state of the IG 1 voltage. When the charged state of the auxiliary battery is equal to or less than a predetermined level, a control operation may be executed to maintain the charged state of the auxiliary battery at the predetermined level, using the main battery. In addition, recharging time and recharging voltage may be adjusted based on variation in auxiliary battery state. As a result, discharge caused by aging of the second battery or an increase in dark current may be rectified.

Referring to FIG. 3, the first controller 200 may be configured to receiving information regarding the state of the second battery 500 from the second battery sensor 300, and determine the state of the second battery 500, based on the received information, to thus determine whether state of the second battery 500 corresponds to a critical recharging condition (S400).

In an exemplary embodiment, the first controller 200 may be configured to determine whether the determined state of the second battery 500 corresponds to the critical recharging condition, based on whether the voltage of the second battery 500 is less than a predetermined voltage (e.g., recharging allowable voltage) or whether the SOC of the second battery is less than a recharging allowable SOC.

When the determined state of the second battery 500 corresponds to the critical recharging condition, the first controller 200 may be configured to request that the recharging determiner 100 perform automatic recharging (S410). In response to receiving a recharging request from the first controller 200, the recharging determiner 100 may be configured to determine whether the state of the vehicle and the state of the first battery 600 correspond to a recharging prohibition condition (S300).

In an exemplary embodiment, the recharging prohibition condition may be when it is determined that doors, a hood, a tail gate, etc. of the vehicle are closed, based on signals received from a door opening switch (e.g., sensor), a hood opening switch, a tail gate opening switch, etc, when the voltage of the first battery 600 is less than a predetermined voltage, when SOC of the first battery 600 is less than a predetermined SOC, when recharging is continuously executed a predetermined number of times or more, or when the voltage of the second battery 500 remains less than the predetermined voltage or SOC of the first battery 600 remains less than the predetermined SOC, after monitoring for a predetermined period of time after recharging.

When the recharging determiner 100 determines that the state of the vehicle and the state of the first battery 600 do not correspond to the recharging prohibition condition (S310), the recharging determiner 100 may be configured to request that the second controller 400 perform switching-on of the relay 700 (S320). Simultaneously with the request of switching-on of the relay 700 to the second controller 400, the recharging determiner 100 may be configured to transmit a signal representing allowance of recharging based on switching-on of the relay 700 (S330).

The first controller 200 may be configured to execute recharging of the second battery 500, and, simultaneously, execute a control operation associated with recharging time and recharging voltage (S430). In particular, when the first controller 200 determines, after monitoring state of the second battery 500, that voltage of the second battery 500 is greater than the recharging allowable voltage, SOC of the second battery 500 is greater than the predetermined SOC, or recharging time exceeds a predetermined time, the first controller 200 may be configured to complete recharging (e.g., the control operation), and request that the recharging determiner 100 initialize the recharging interval (S440). Thereafter, the recharging determiner 100 may be configured to initialize the RTC, to initialize the recharging interval, and operate the second controller 400 to switch off the relay 700 (S340).

Figure 4:
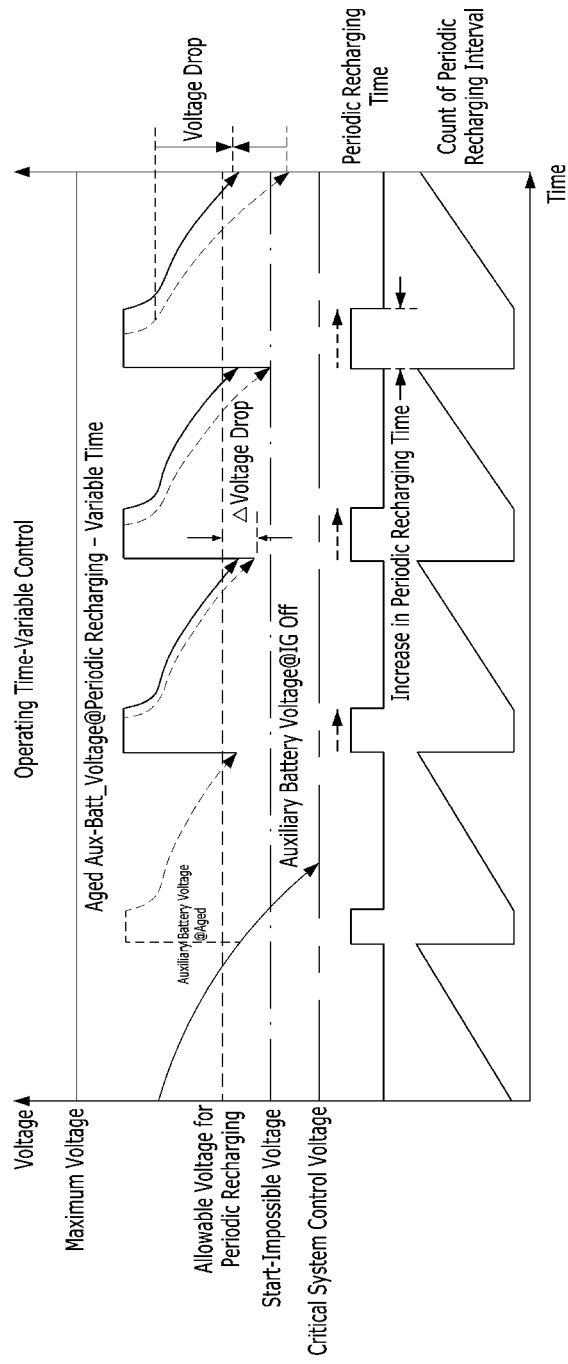
FIG. 4 is a diagram illustrating effects obtained through recharging time control according to an exemplary embodiment of the present invention.

FIG. 4 is a diagram illustrating effects obtained through recharging time control according to an exemplary embodiment of the present invention. FIG. 5 is a diagram illustrating effects obtained through recharging voltage control according to an exemplary embodiment of the present invention. FIG. 6 is a diagram explaining effects obtained through recharging interval control according to an exemplary embodiment of the present invention.

The recharging time control and recharging voltage control may be executed by the first controller 200, whereas the recharging interval control may be executed by the recharging determiner 100. Recently developed vehicles have a tendency toward an increase in the number of electric elements. Accordingly, dark current may be increased. In addition to an increase in dark current, voltage drop of an auxiliary battery may be increased due to aging of the auxiliary battery. Therefore, in the present invention, a variation in voltage drop of the auxiliary battery may be monitored and, thus, it may be possible to prevent a decrease of the voltage of the auxiliary battery to below a minimum start enabling voltage by increasing the recharging time, increasing the recharging voltage, or reducing the recharging interval based on the monitored results.

The above-described exemplary embodiments of the present invention may be realized as code, which may be written on a recording medium that may be read by a processor equipped in the home appliance and may be read by a processor. The recording medium that may be read by a processor includes all types of recording media, on which data that may be read by a processor is written, such as a hard disk drive (HDD), a solid state disk (SSD), a silicon disk drive (SDD), a read only memory (ROM), a random access memory (RAM), a CD-ROM, a magnetic tape, a floppy disk, an optical data storage, and a carrier wave type (e.g., transmission over the Internet).

The non-transitory computer-readable recording medium is distributed to computer systems connected over a network, and computer-readable code may be stored and executed in a distributed manner. Further, a functional program, code and code segments for implementing the above-described method can be easily inferred by programmers in the technical field to which the present invention pertains.

It will be appreciated by persons skilled in the art that the effects that may be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A battery recharging control method, comprising:
   determining, by a recharging determiner, whether a recharging prohibition condition has been established, based on first state information of a vehicle and second state information of a first battery, at a recharging interval of a predetermined period of time, in response to executing a periodic recharging mode, based on a first ignition (IG) voltage applied thereto;
   executing recharging, by the recharging determiner, based on a determination result by a first controller as to whether a critical recharging condition has been established, based on third state information of a second battery, when the recharging determiner executes an automatic recharging mode, based on a second IG voltage applied thereto; and calculating a voltage variation of the second battery selected from the third state information by the first controller, and adjusting at least one of a recharging time and a recharging voltage by the first controller, based on the calculated voltage variation, or adjusting the recharging interval by the recharging determiner, based on the calculated voltage variation.

2. The battery recharging control method according to claim 1, further comprising:
determining, by the recharging determiner, whether the automatic recharging mode or the periodic recharging mode requires execution, based on the applied IG voltage.

3. The battery recharging control method according to claim 2, further comprising:
activating a relay by a second controller and executing recharging of the second battery by the first controller when the third state information corresponds to the critical recharging condition.

4. The battery recharging control method according to claim 3, further comprising:
completing the recharging of the second battery by the first controller when the third state information exceeds the critical recharging condition.

5. The battery recharging control method according to claim 4, further comprising:
transmitting, by the recharging determiner, information regarding the determined recharging mode to the first controller when the at least one of the first state information and the second state information does not correspond to the recharging prohibition condition.

6. The battery recharging control method according to claim 5, wherein the activation of the relay by the second controller and execution of the recharging of the second battery by the first controller when the third state information corresponds to the critical recharging condition comprises:
receiving, by the first controller, the third state information regarding the second battery from a second battery sensor; and
determining, by the first controller, whether the third state information corresponds to the critical recharging condition.

7. The battery recharging control method according to claim 6, wherein the activation of the relay by the second controller and execution of the recharging of the second battery by the first controller when the third state information corresponds to the critical recharging condition comprises:
requesting, by the second controller, the recharging determiner to allow recharging when the third state information corresponds to the critical recharging condition; and
requesting, by the recharging determiner, the second controller to activate the relay based on the request for the recharging allowance.

8. The battery recharging control method according to claim 7, wherein the completing of the recharging of the second battery by the first controller when the third state information exceeds the critical recharging condition comprises:
requesting, by the second controller, the recharging determiner to complete recharging; and
requesting, by the recharging determiner, the second controller to deactivate the relay based on the request for the recharging completion.

9. The battery recharging control method according to claim 8, wherein the completing of the recharging of the second battery by the first controller when the third state information exceeds the critical recharging condition comprises:
initializing the recharging interval by the recharging determiner.

10. A battery recharging control apparatus, comprising:
a recharging determiner configured to determine whether a recharging prohibition condition has been established, based on first state information of a vehicle and second state information of a first battery, at a recharging interval of a predetermined period of time, in response to execution of a periodic recharging mode, based on a first ignition (IG) voltage applied thereto, and configured to execute recharging based on whether a critical recharging condition has been established, using third state information of a second battery, when the recharging determiner executes an automatic recharging mode, based on a second IG voltage applied thereto; and
the first controller configured to calculate a voltage variation of the second battery selected from the third state information, and adjust at least one of a recharging time and a recharging voltage, based on the calculated voltage variation,
wherein the recharging determiner is configured to adjust the recharging interval, based on the calculated voltage variation.

11. The battery recharging control apparatus according to claim 10, wherein the recharging determiner is configured to determine whether the automatic recharging mode or the periodic recharging mode requires execution based on the applied IG voltage.

12. The battery recharging control apparatus according to claim 11, further comprising:
a second controller configured to activate a relay,
wherein the first controller is configured to execute recharging of the second battery when the third state information corresponds to the critical recharging condition.

13. The battery recharging control apparatus according to claim 12, wherein the first controller is configured to complete the recharging of the second battery when the third state information exceeds the critical recharging condition.

14. The battery recharging control apparatus according to claim 13, wherein the recharging determiner is configured to transmit information regarding the determined recharging mode to the first controller when the at least one of the first state information and the second state information does not correspond to the recharging prohibition condition.

15. The battery recharging control apparatus according to claim 14, further comprising:
a battery sensor configured to transmit the third state information of the second battery to the first controller,
wherein the first controller is configured to determine whether the third state information corresponds to the critical recharging condition.

16. The battery recharging control apparatus according to claim 15, wherein the second controller is configured to request the recharging determiner to allow recharging when the third state information corresponds to the critical recharging condition and the recharging determiner is configured to request the second controller to activate the relay based on the request for the recharging allowance.

17. The battery recharging control apparatus according to claim 16, wherein the second controller is configured to request the recharging determiner to complete recharging and the recharging determiner is configured to request the second controller to deactivate the relay based on the request for the recharging completion.

18. The battery recharging control apparatus according to claim 17, wherein the recharging determiner is configured to request the recharging interval.

19. A non-transitory computer-readable recording medium containing program instructions executed by a processor, the non-transitory computer readable medium comprising:
  program instructions that determine whether a recharging prohibition condition has been established, based on first state information of a vehicle and second state information of a first battery, at a recharging interval of a predetermined period of time, in response to executing a periodic recharging mode, based on a first ignition (IG) voltage applied thereto;
  program instructions that execute recharging based on a determination result by a first controller as to whether a critical recharging condition has been established, based on third state information of a second battery, in response to executing an automatic recharging mode, based on a second IG voltage applied thereto; and
  program instructions that calculate a voltage variation of the second battery selected from the third state information and adjust at least one of a recharging time and a recharging voltage based on the calculated voltage variation, or adjust the recharging interval based on the calculated voltage variation.

* * * * *